March 12, 1968 J. DE ROBERTIS 3,373,319

CIRCUITRY SYSTEM

Filed April 22, 1966 2 Sheets-Sheet 1

INVENTOR.
JOSEPH DE ROBERTIS
BY
JOHN P. CHANDLER
ATTORNEY.

CIRCUITRY SYSTEM

Filed April 22, 1966 2 Sheets-Sheet 2

INVENTOR
JOSEPH DE ROBERTIS
BY
JOHN P. CHANDLER
ATTORNEY.

United States Patent Office 3,373,319
Patented Mar. 12, 1968

3,373,319

CIRCUITRY SYSTEM

Joseph De Robertis, Yorktown Heights, N.Y., assignor to Sealectro Corporation, Mamaroneck, N.Y., a corporation of New York Filed Apr. 22, 1966, Ser. No. 544,564
4 Claims. (Cl. 317—101)

This invention relates to circuitry systems and has for its principal object to provide means for selectively connecting one or more circuits of a given series of circuits with one or more circuits of another series of electrical circuits.

Another object of the invention is to provide a wiring system having a plurality of conductor cards with etched or printed conductive strips or paths extending across each card in spaced, parallel arrangement, a pair of cards being mounted in a supporting frame in spaced relation and with the conductive strips of one card disposed at an angle of 90° to those on adjacent card, and electric connection is made to the strips of each circuit card by a conventional connecting header.

Between each pair of printed circuit cards is a pre-programmed connector board or insert of insulating material and with holes to receive spring urged interponents or connectors which are provided with contacts at their opposed ends and between these contacts there are positioned electrical components such as a diode, a capacitor, or a resistor, or the spring urged elements may have straight-thru connections to form shorting pins or simple connectors. Each conducting pin connects a particular conducting strip on one card with another strip at right angles thereof on an adjacent card and the contacts at the opposed ends of the assembly are of such distance apart that when the springs positioned between the same are under a measure of compression, they afford an approved electrical connection between the aforesaid conductive paths.

The supporting frame, earlier mentioned, has a plurality of pairs of slots to receive the circuit cards and the intermediate insulating board carrying the connecting pins. When a pin must be moved to a new location, or other pins added or deleted, the insert is easily slid out from the frame.

It will be apparent that the present improved system is vastly superior to systems employing sandwich-like layers of criss-cross electrical conductors where pins pass through aligned holes in the layers. When it is desired to selectively interconnect one circuit, or a branch thereof, with one or more branches of a second circuit, it can be done with greater speed than in existing apparatus using pins driven through the perforations at points of intersection of the coordinate rows.

Figures 1, 2, 3, 4:
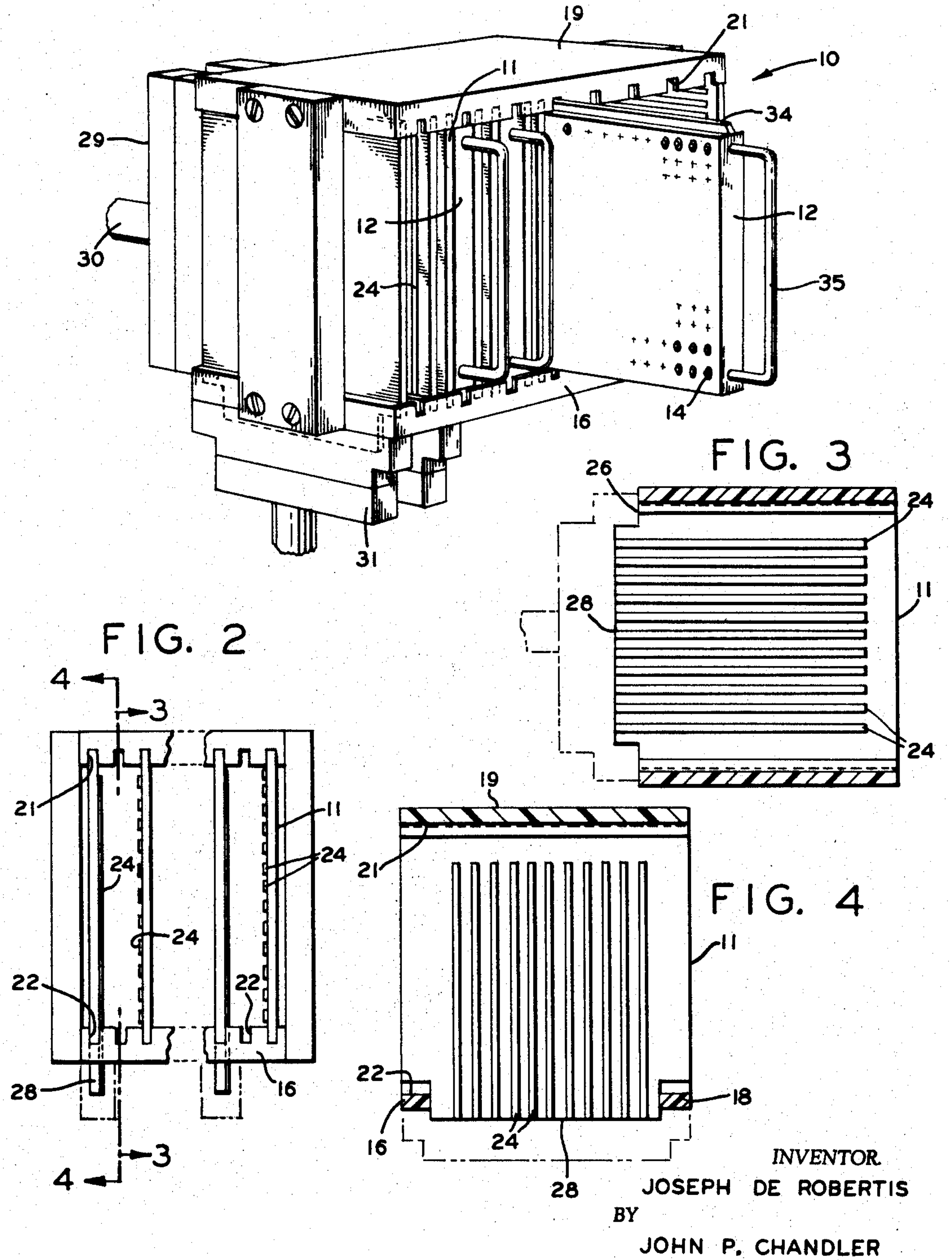
FIG. 1 is a perspective view of the three part assembly of the present invention, one of the pre-programmed connector inserts being shown partially removed from the frame.
FIG. 2 is a broken front elevation of the unit with the inserts removed.
FIG. 3 is a side elevation of a conductor board with the conductor in horizontal position and in place in the frame.
FIG. 4 shows the conductor strips in vertical position.
Figure 5:
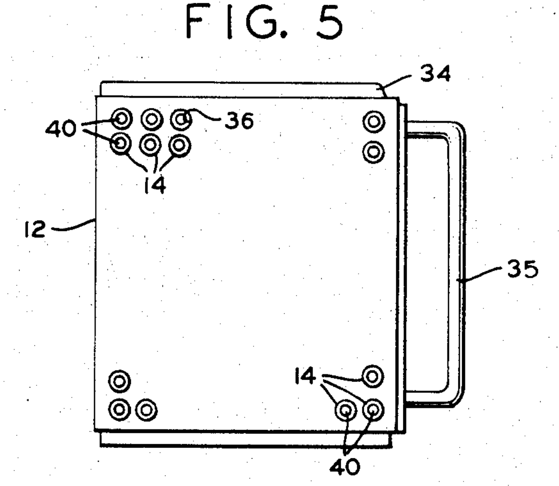
FIG. 5 is a side elevation of the pre-programmed insert.
Figure 6:
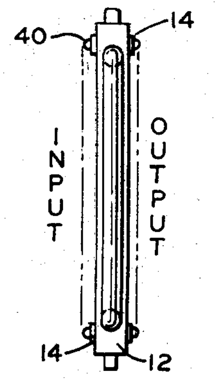
FIG. 6 is a front elevation thereof.

The complete assembly is shown in FIG. 1 and it includes a frame 10 supporting a plurality of printed circuit cards 11 and between each pair of cards there is positioned a removable connector board or insert of insulating material 12 having rows of holes in symmetrical horizontal and vertical arrangement and carrying the tubular spring urged connector assemblies or interponents 14, this unit forming a pre-programmed insert which can be varied at will and with ease.

The frame may have front and rear lower rails 16 and 18 and an upper wall 19, the latter having cross slots 21 and the rails having slots 22, all spaced uniformly to receive the conductor cards. These cards are readily removed from the slots, although they are removed less frequently than the inserts and are slid in from the front and can be readily taken out since the only occasion for removing them is when a conducting path is excessively worn. One of the conductor cards 11 shown in FIG. 3 has horizontal strips 24 of conductive material etched or otherwise formed thereon and the two rear corners have rectangular cut-out sections 26, thus leaving a rearwardly projecting part 28 which receives and supports a connector 29 of conventional construction and having connecting wires enclosed in a tube 30 and connected with the conducting paths.

The conductor board 11 shown in FIG. 4 is of identical construction except that the conductive paths 24 are positioned horizontally when in the frame and the connector 31 for these boards extends downwardly.

The removable insert 12 which is formed of insulating material is of sufficient thickness to provide suitable axial support for the connectors or interponents 14 and it has upper and lower slide rails 34 for entry into the frame slots. It has an over-all pattern of through holes 36 arranged in rows. Thus, if there are 11 conductive paths 24 on the conductor cards, there are 11 rows of 11 holes in the insert, each with the rows aligned horizontally and vertically.

Figure 7:
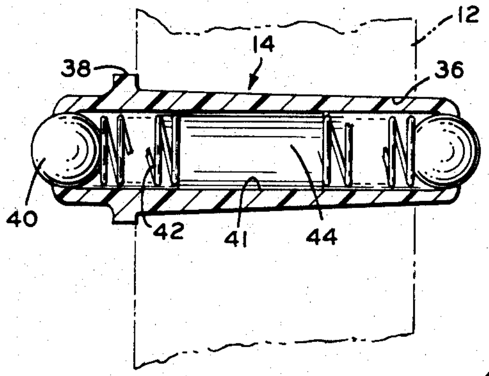
FIG. 7 is a central section taken through a tubular connector element.

The connector unit 14 of FIG. 7 includes a generally cylindrical housing of insulating material and it may be slightly tapered and be received in the hole 36 in the insert which will also be slightly tapered. This provides an interference fit and allows the connector to be readily removed for replacement. A shoulder 38 limits movement into the hole in the insert.

Figure 8:
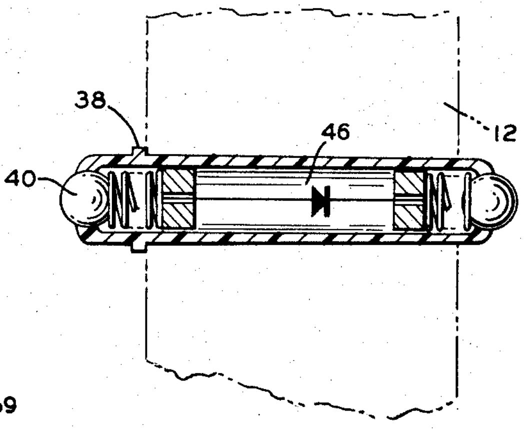
FIG. 8 shows a similar element with a component therein.

A ball 40 in each end of the bore 41 of the housing forms the actual connector with the conductive strips and the ends of the housing are constricted to retain the ball captive. Two springs 42 urge the balls outwardly and a solid section 44 of bar stock is positioned between the springs. The connector structure of FIG. 8 is identical except that an electrical component 46 such as a resistor or diode is positioned in conductive relation between the balls.

Figure 9:
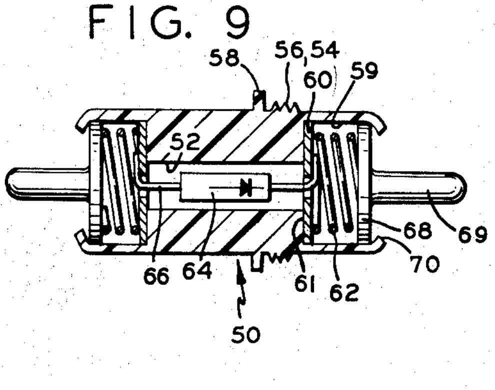
FIG. 9 shows a modified element.

The spring loaded component holder shown in FIG. 9 includes the generally cylindrical housing 50 formed of insulating material and provided with a through bore 52 having counterbored end sections leaving thin walls 54 at said end sections. Externally the housing body has a threaded section 56 with a shoulder 58 to limit the threaded engagement. The counterbores provide a pair of axially aligned cavities 59 having inner shoulders 61 engaged by a pair of conductive shims or plates 60 which are engaged by a metal compression spring 62. An electrical component 64 such as a diode has its opposed terminals 66 positioned between the plate and the spring in conductive relation to the latter. The other end of each spring engages a head 68 to which a conductor 69 is secured as by solder, forming the contact. The parts are so proportioned that the springs are under compression when assembled and the opposed ends of the cavities are formed over at 70 to make said contacts captive.

From the foregoing, it will be seen that current, initiated at one contact will flow through one spring, the conductive shim, through the component, and terminate through the opposite contact.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

The embodiments of the invention in which an exclusive property or privilege is claimed are defined as follows:

1. An electrical control system comprising spaced frame members having a plurality of pairs of opposed slots, conductor cards received in first and third pairs of said slots, each having a plurality of parallel conducting paths formed thereon, the paths on one card being at right angles to those on the second card of the pair and facing each other, and a connector board of insulating material positioned between said conductor cards in an intermediate pair of slots and having a plurality of rows of openings corresponding to lines of intersection of said conducting paths, and connectors having contacts at their ends which are spring urged outwardly and which are positioned in selected openings in the connector board, said contacts engaging a conducting path in each conductor card.

2. The structure recited in claim 1 wherein the contacts at the ends of the connectors are balls and a compression spring between the balls urge the same outwardly.

3. The structure recited in claim 1 wherein the contacts at the ends of the connectors are formed as fingers and a compression spring between the balls urge the same outwardly.

4. The structure recited in claim 1 wherein an electrical component such as a diode, a resistor or a capacitor is positioned between the contacts.

References Cited

UNITED STATES PATENTS

| | | | |
|---|---|---|---|
| 2,853,656 | 9/1958 | Dowds | 317—101 |
| 2,872,664 | 2/1959 | Minot | 317—101 |
| 3,098,177 | 7/1963 | Bleier et al. | 317—101 |
| 3,215,898 | 11/1965 | Perret et al. | 339—18 |
| 3,223,957 | 12/1965 | Cannon | 339—18 |

ROBERT K. SCHAEFER, *Primary Examiner.*

D. SMITH, *Assistant Examiner.*